May 20, 1930. H. B. MARSTON 1,759,410
PNEUMATIC TIRE
Original Filed Aug. 3, 1925

Inventor
Harold B. Marston,

WITNESS:—
Attorney

Patented May 20, 1930

1,759,410

UNITED STATES PATENT OFFICE

HAROLD B. MARSTON, OF PHILADELPHIA, PENNSYLVANIA

PNEUMATIC TIRE

Application filed August 3, 1925, Serial No. 47,946. Renewed October 8, 1928.

This invention relates to pneumatic tires, and has for its object to provide certain new and useful improvements for producing a strong and durable tire casing or carcass capable of withstanding the wear and shocks incident to heavy duty use, thereby to enable the successful and practical use of pneumatic tires on heavily loaded vehicles.

My invention is primarily a new cord for the production of the so-called latex-dipped or gum-dipped cord tire, and embodies great strength while preserving the desired resilient properties.

In carrying out my invention, I employ metal strands or wires of relatively small diameter which are incorporated in a cord in a manner to enable the convenient building up therefrom of a tire casing or carcass in accordance with any of the conventional methods of tire building. The metal wires are employed primarily for strength and resiliency rather than for armoring purposes, and are so incorporated in the cord as to avoid abrading one another as well as to avoid cutting through the surrounding rubber body of the tire-carcass.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

The cord of the present invention includes a core 1 of elastically yieldable material capable of being compressed and of quickly regaining its original form when pressure is removed therefrom. Around this core is closely twisted, as in rope making, a plurality of wire strands 2 preferably of steel or other strong, tough and elastic metal, each metal strand being provided with a sheath or covering 3 of cotton or other fibrous material. Metal strands are employed for the purpose of giving strength and resiliency to the cord and to the tire built thereof, while the sheathing or covering 3 prevents the abrading of adjacent wires and also prevents said wires from cutting through the rubber body of the tire in which the cord is incorporated. Each sheathed wire strand may be dipped in latex or gum prior to being twisted about the core 1. After a plurality of sheathed wires are twisted around the core, the cord formed thereby may be dipped in latex or gum as the finishing step in the making of the cord.

Figure 4:
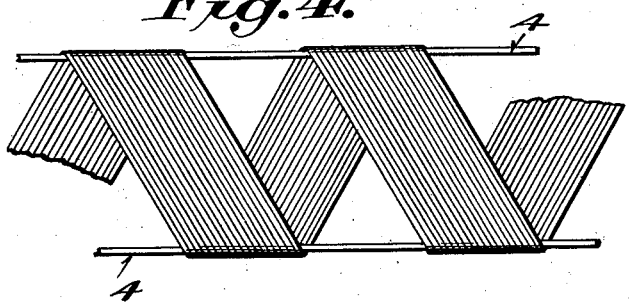
Figure 4 is a diagrammatic view showing one method of employing the improved cord in the building of a tire casing or carcass.
Figure 5:
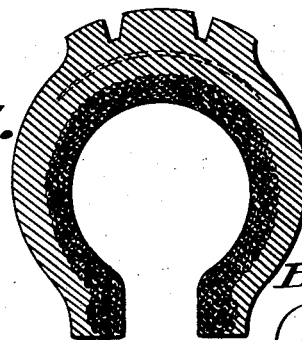
Figure 5 is a cross sectional view of a tire casing or carsass built up from cords of the present invention.

The cord of the present invention may be incorporated in a fabric and a tire casing or carcass built up therefrom in the usual manner. On the other hand the cords of the present invention may be wound back and forth across a pair of spaced wires 4 arranged in annular form, in the manner shown in Figure 4 of the drawings, until a complete cylinder is formed, and the structure then shaped about a core to give it the standard conventional tire shape, after which the rubber tread, side walls, etc. are applied and the complete casing then vulcanized as in usual practice.

From the foregoing description, it will be understood that each of the twisted wire strands is a helix embracing the elastically yieldable core 1. When tension comes upon the cord, each helix tends to become elongated, and the diameter thereof to be reduced and thus the helix squeezes the elastically yieldable core 1 and compresses the same, whereby elastic elongation of the cord occurs, and immediately upon removal or reduction of the strain or tension, the wire coils will release or reduce their grips squeezing upon the elastic core and the latter will tend to resume its normal condition thereby aiding and assisting the coiled wire strands in resuming their normal conditions. The slight elongation or stretching of the cord permitted by this arrangement tends to prevent breaking of the cord and rupturing of the tire due to sudden and excessive strains caused by road shocks. During these movements of the parts of the cord, abrasion of the wires is prevented by the fabric sheaths 3, which also prevent the metal wires from cutting through the rubber portions of the tire case or carcass.

Figure 1:
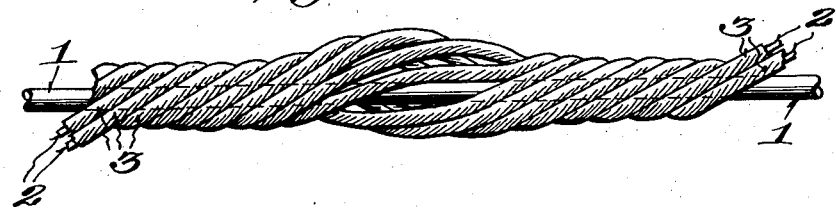
Figure 1 is a side elevation of the cord of the present invention.
Figure 2:
Figure 2 is a cross sectional view thereof.
Figure 3:
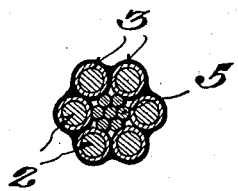
Figure 3 is a view similar to Figure 2 showing a modification.

In Figure 2 of the drawings, the elastic core 1 is shown as a single solid strand, while in Figure 3 of the drawings there has been shown a modified form wherein the elastic core 5 is made up of a plurality of strands twisted together as in a rope or cord or otherwise assembled. In whatever physical form the core may be, it must be elastically compressible so as to assist in returning the coiled wire strands to their normal conditions when tension on the cord is relieved.

A pneumatic tire built of cords in accordance with the present invention will have great strength and durability and will be able to stand up under heavy duty work, such as is encountered in connection with large heavily loaded trucks and busses with the material increase of air pressure necessary in pneumatic tires employed on such vehicles. The tire will have great pliability because each wire strand is in the form of a pliable helix. Great elasticity will be assured by reason of the elastic action of the core of each cord assisting in the returning of each wire strand to its normal condition after tension strains are relieved. Because of the strength of the individual cords the number of plies in a tire may be reduced, thereby avoiding an over-thick and relatively stiff tire wall, while at the same time obtaining easier riding qualities not only because of the reduction in the side wall thickness, but also because of the proportionately greater air space within the tire. This characteristic also permits the use of the cord of this invention in a thinner-wall tire of relatively great strength on ordinary light-load passenger vehicles with a corresponding gain in easy riding qualities.

What I claim is:

1. A pneumatic tire cord comprising an elastically compressible core and a plurality of sheathed elastic wire strands twisted upon the core in close mutual relation, each strand constituting a helical spring embracing the core and free to contract and expand.

2. A gum-dipped pneumatic tire cord, comprising an elastically yieldable core and a plurality of sheathed elastic wire strands twisted upon the core in close mutual relation, each strand constituting a helical spring embracing the core and free to contract and expand.

3. A pneumatic tire cord comprising an elastically compressible core and a plurality of sheathed metal strands twisted upon the core in close mutual relation, said strands being free to squeeze the elastic core under tension stresses, and also free to reduce the squeeze when tension stresses are reduced.

4. A pneumatic tire cord comprising an elastically compressible core and a plurality of sheathed metal strands closely twisted upon core, said strands being free to squeeze the elastic core under tension stresses, and also free to reduce the squeeze when tension stresses are reduced.

5. A pneumatic tire cord comprising an elastically compressible core and a plurality of sheathed metal strands closely twisted upon said core, each strand constituting a helix snugly embracing the core and free to contract and expand, each helix being free to reduce the squeeze when tension stresses are reduced.

6. A pneumatic tire casing including cords made up of elastically compressible cores and a plurality of sheathed metal strands snugly twisted upon said cores in close mutual relation, said strands being free to squeeze the elastic core under tension stresses, and also free to reduce the squeeze when tension stresses are reduced.

7. A pneumatic tire casing including cords made up of elastically compressible cores and a plurality of sheathed wire strands twisted upon the elastic cores in close mutual relation, each strand constituting a helix embracing the core, each helix being free to contract upon and squeeze the core under tension stresses, and also free to expand and reduce the squeeze when tension stresses are reduced.

HAROLD B. MARSTON.